United States Patent
Kim et al.

(10) Patent No.: US 8,296,082 B2
(45) Date of Patent: Oct. 23, 2012

(54) SYSTEM FOR TESTING PERFORMANCE OF ARRAY ULTRASOUND TRANSDUCER

(75) Inventors: Yong-tae Kim, Daejeon (KR);
Moon-jae Jho, Daejeon (KR); Sung-soo Jung, Daejeon (KR); Ho-chul Kim, Daejeon (KR); Yong-hyeon Yun, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 475 days.

(21) Appl. No.: 12/525,899

(22) PCT Filed: Mar. 9, 2007

(86) PCT No.: PCT/KR2007/001165
§ 371 (c)(1),
(2), (4) Date: Aug. 5, 2009

(87) PCT Pub. No.: WO2008/096926
PCT Pub. Date: Aug. 14, 2008

(65) Prior Publication Data
US 2010/0313628 A1    Dec. 16, 2010

(30) Foreign Application Priority Data
Feb. 8, 2007 (KR) .................. 10-2007-0013304

(51) Int. Cl.
- G01B 7/287 (2006.01)
- G01B 17/04 (2006.01)
- G01F 3/24 (2006.01)
- G01F 3/30 (2006.01)

(52) U.S. Cl. .............. 702/39; 702/36; 702/48; 702/49
(58) Field of Classification Search .............. 702/116; 73/1.82
See application file for complete search history.

(56) References Cited

U.S. PATENT DOCUMENTS
| | | | | |
|---|---|---|---|---|
| 5,357,423 A | * | 10/1994 | Weaver et al. | 700/28 |
| 5,406,503 A | * | 4/1995 | Williams et al. | 702/106 |
| 5,889,194 A | | 3/1999 | Adams | |
| 7,028,529 B2 | | 4/2006 | Gessert et al. | |
| 2006/0191315 A1 | * | 8/2006 | McCartan et al. | 73/1.82 |

FOREIGN PATENT DOCUMENTS
| | | |
|---|---|---|
| KR | 10-2006-0124237 | 12/2006 |
| KR | 10-2007-0065934 | 6/2007 |

OTHER PUBLICATIONS
PCT International Search Report of PCT/KR2007/001165 filed on Mar. 9, 2007.

* cited by examiner

*Primary Examiner* — Mohamed Charioui
*Assistant Examiner* — Felix Suarez
(74) *Attorney, Agent, or Firm* — Kile Park Goekjian Reed & McManus PLLC (57) ABSTRACT

A performance inspection system for an array ultrasound transducer includes: a driver for selectively applying an electric signal to all or some parts of constituent channels of the array ultrasound transducer; an acoustic power measurement unit for measuring an ultrasound acoustic power emitted from individual channels receiving the same voltage from the driver; a radiation conductance conversion unit for measuring a voltage signal applied to each channel although the driver applies different voltages to the individual channels, and converting the measured voltage into an ultrasound acoustic power acquired when the same voltage is applied to the channels; and a channel uniformity estimation unit for estimating uniformity of the acoustic power value acquired by the radiation conductance conversion unit or uniformity of acoustic power values of the individual channels measured under the same voltage.

5 Claims, 5 Drawing Sheets

SYSTEM FOR TESTING PERFORMANCE OF ARRAY ULTRASOUND TRANSDUCER

CROSS REFERENCE TO RELATED APPLICATIONS

This is a national entry of International Application No. PCT/KR2007/001165 filed Mar. 9, 2007, which claims priority to Korean Application No. 10-2007-0013304 filed on Feb. 8, 2007.

BACKGROUND OF THE INVENTION

1. Field of the Invention

The present invention relates to a system for inspecting a performance of array ultrasound transducer, and more particularly to a system for inspecting a performance of an array ultrasound transducer, which can selectively evaluate acoustic power, radiation conductance, uniformity of the acoustic power or the radiation conductance, and uniformity of sound pressure sensitivity according to a variety of uses (e.g., oscillation, reception, or oscillation/reception) of the array ultrasound transducer.

2. Description of the Related Art

Generally, ultrasound transducers have been widely used as devices or components which convert an electric signal into an ultrasound signal or convert the ultrasound signal into the electric signal. A representative example of the ultrasound transducer is an array ultrasound transducer capable of geometrically arranging a plurality of ultrasound transducers in the form of an appropriate arrangement, thereby forming a desired sound field.

There are a variety of application devices of the array ultrasound transducer, for example, an ultrasound diagnostic system (also called an ultrasound imaging system), an ultrasound treating/operating system, an ultrasound non-destructive evaluation system, a household- or personal-ultrasound system, an ultrasound physical property measurement system, and an industrial ultrasound system, etc.

In more detail, the ultrasound diagnostic system includes an ultrasound imaging diagnostic device, an ultrasound Doppler diagnostic device, an ultrasound bone densitometer, an ultrasound angiography system, an ultrasonic rheometer, a fetal ultrasound imaging system, an ultrasound coronary angiography system, an ultrasound cerebral angiography, and an ultrasound pulse diagnosis system, etc.

The ultrasound treating/operating system for use in a variety of treating/operating purposes includes an ultrasound stimulator, an ultrasound extra-corporal shockwave lithotripsy device, an ultrasound intra-corporal shockwave lithotripsy device, an ultrasound vitreous aspiration and cutting instrument, an ultrasound crystalline-lens cutting device, an ultrasound operating instrument, and an ultrasound aspiration instrument, etc.

The ultrasound non-destructive evaluation system for evaluating safety of a variety of objects (e.g., buildings, bridges, and materials) includes an ultrasound scanning device, an ultrasound thickness measurement device, an ultrasound flaw detector.

The household- or personal-ultrasound system includes an ultrasound dish washer, an ultrasound humidifier, a personal ultrasound stimulator, and a personal ultrasound skin cosmetic device.

The ultrasound physical property measurement system for measuring the physical property of various materials (e.g., solid, liquid, and gas) includes an ultrasound sound speed measurement device, an ultrasound attenuation coefficient measurement device, and an ultrasound elastic coefficient measurement device, etc.

The industrial ultrasound system using high-intensity ultrasound signals includes an ultrasound abrasive cutoff device, an ultrasound welding machine, an ultrasound emulsifier, an ultrasound sonicator, a ultrasound cleaner for glasses, a megasonic ultrasound cleaner, and an ultrasound cutting machine, etc.

Particularly, the ultrasound diagnosis system, the ultrasound non-destructive evaluation system, and the ultrasound physical property measurement system are employing all of the oscillation ultrasound transducer, the reception ultrasound transducer, and the oscillation/reception ultrasound transducer. The ultrasound treating/operating system, the household- or personal-ultrasound system, and the industrial ultrasound system are employing only the oscillation ultrasound transducer.

The above-mentioned array ultrasound transducer has been configured by the combination of general ultrasound transducers, such that its overall performance is dependent on performances of the ultrasound transducers.

As can be seen from the following Table 1, the general ultrasound transducer (also called a single ultrasound transducer) employs a plurality of performance evaluation parameters to evaluate performance. The oscillation ultrasound transducer evaluates a variety of parameters, for example, acoustic power, radiation conductance, sound field (sound pressure or acoustic intensity) spatial distribution, etc.

The reception ultrasound transducer evaluates the sound pressure sensitivity. The oscillation/reception ultrasound transducer evaluates the relative sound pressure sensitivity.

Although the performance evaluation parameters for the above-mentioned ultrasound transducers must also be applied to the array ultrasound transducer, only some parts of evaluation parameters for evaluating performances of the current array ultrasound transducer are being evaluated as shown in the following Table 1, the oscillation ultrasound transducer is unable to evaluate the acoustic power, the radiation conductance, and the uniformity of the acoustic power or the radiation conductance, the reception ultrasound transducer is unable to evaluate the uniformity of the acoustic power or the radiation conductance, and the oscillation/reception ultrasound transducer is unable to evaluate the uniformity of the acoustic power or the radiation conductance.

TABLE 1

|  | Single ultrasound transducer | Array ultrasound transducer |
| --- | --- | --- |
| Oscillation | Acoustic power Radiation conductance Sound field spatial distribution | Sound field spatial distribution |
| Reception | Sound pressure sensitivity | Sound pressure sensitivity |
| Oscillation/ Reception | Relative sound pressure sensitivity | Relative sound pressure sensitivity Uniformity of Relative sound pressure sensitivity |

SUMMARY OF THE INVENTION

Therefore, the present invention has been made in view of the above problems, and it is an object of the present invention to provide a system for inspecting a performance of an array ultrasound transducer, which can selectively evaluate acoustic power, radiation conductance, uniformity of the acoustic power or the radiation conductance, and uniformity of sound pressure sensitivity according to a variety of uses (e.g., oscillation, reception, or oscillation/reception) of the array ultrasound transducer.

In accordance with one aspect of the present invention, the above and other objects can be accomplished by the provision of a performance inspection system for an array ultrasound transducer includes: a driver for selectively applying an electric signal to all or some parts of constituent channels of the array ultrasound transducer; an acoustic power measurement unit for measuring an ultrasound acoustic power emitted from individual channels receiving the same voltage from the driver; a radiation conductance conversion unit for measuring a voltage signal applied to each channel although the driver applies different voltages to the individual channels, and converting the measured voltage into an ultrasound acoustic power acquired when the same voltage is applied to the channels; and a channel uniformity estimation unit for estimating uniformity of the acoustic power value acquired by the radiation conductance conversion unit or uniformity of acoustic power values of the individual channels measured under the same voltage.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in, different drawings. In the following description, a detailed description of known functions and configurations incorporated herein will be omitted when it may make the subject matter of the present invention rather unclear.

Figure 1:
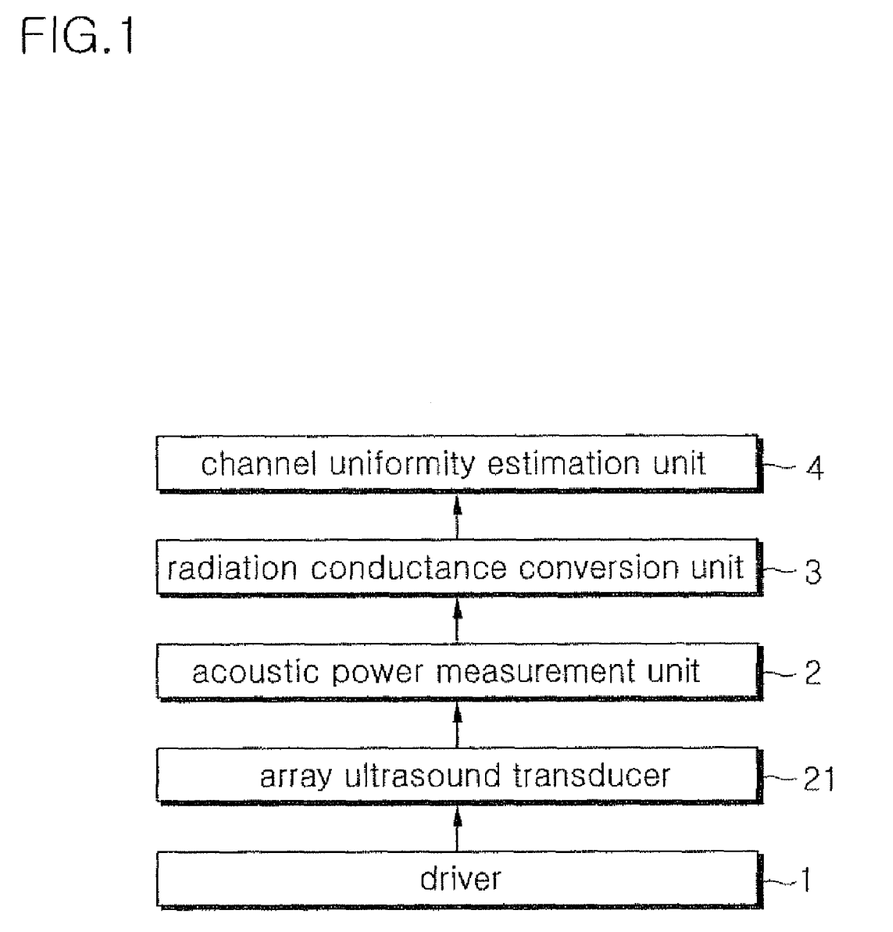
FIG. 1 is a block diagram illustrating a performance inspection system for an array ultrasound transducer according to a preferred embodiment of the present invention.
Figure 2:
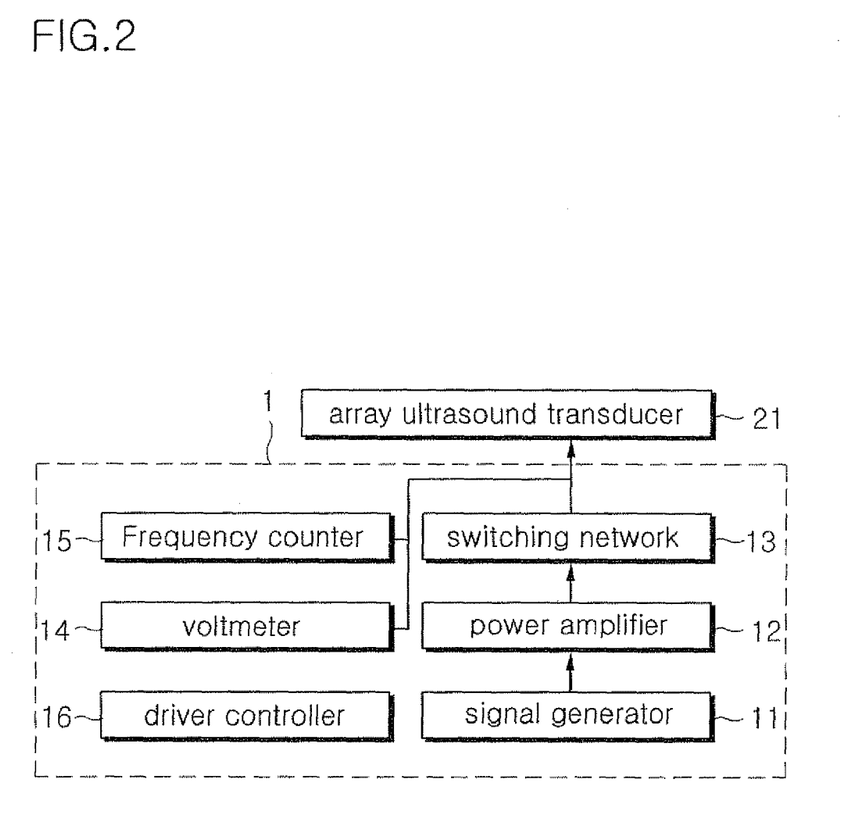
FIG. 2 is a block diagram illustrating a driver contained in the performance inspection system of the array ultrasound transducer according to a preferred embodiment of the present invention.
Figure 3:
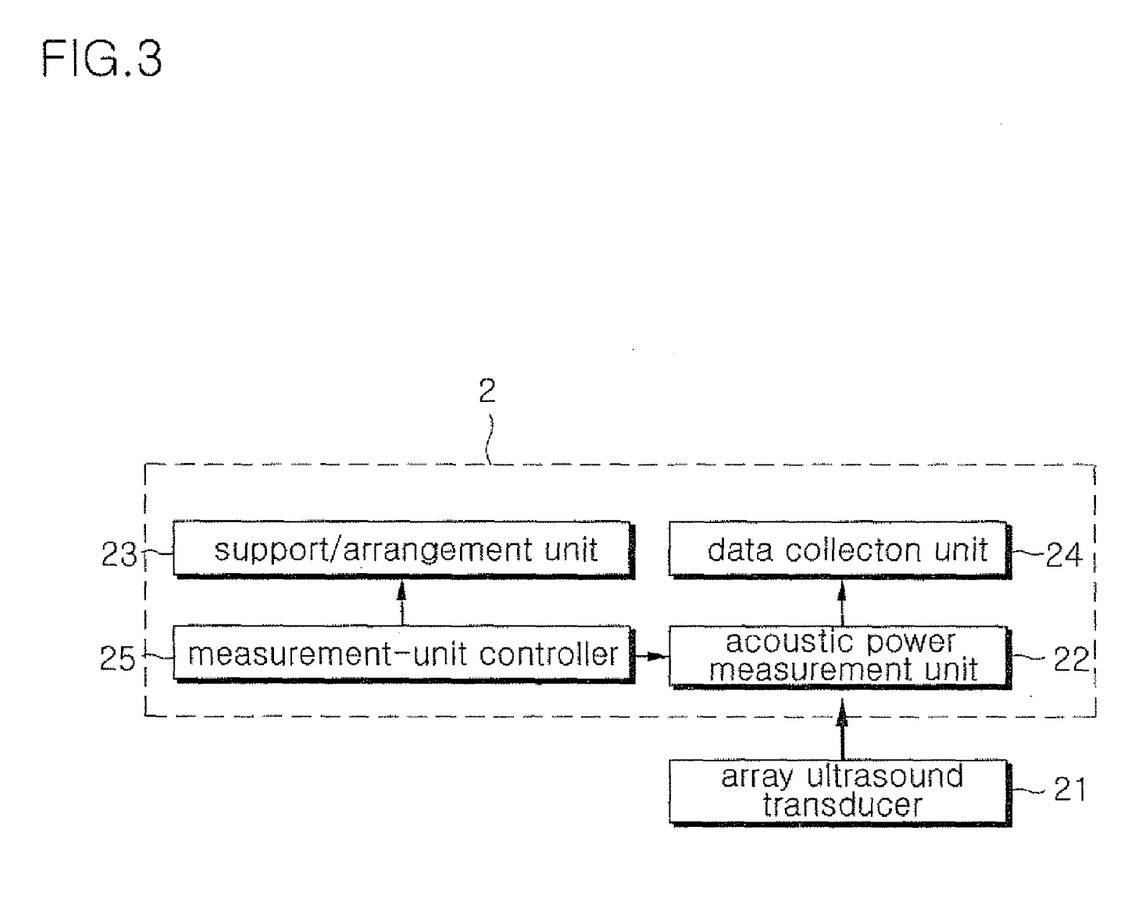
FIG. 3 is a block diagram illustrating an acoustic power measurement unit contained in the performance inspection system for the array ultrasound transducer according to a preferred embodiment of the present invention.
Figure 4:
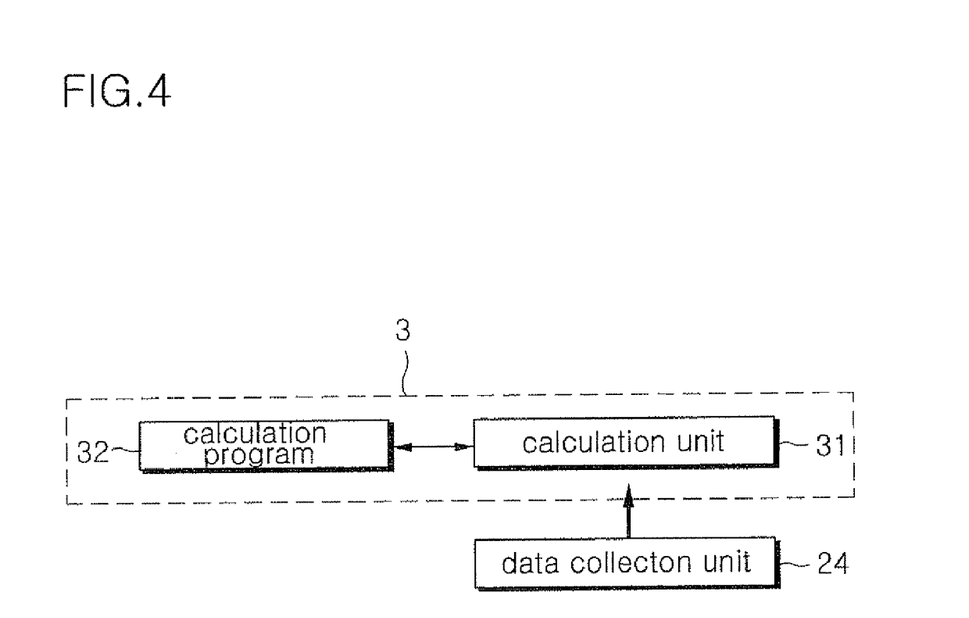
FIG. 4 is a block diagram illustrating a radiation conductance conversion unit contained in the performance inspection system for the array ultrasound transducer according to a preferred embodiment of the present invention.
Figure 5:
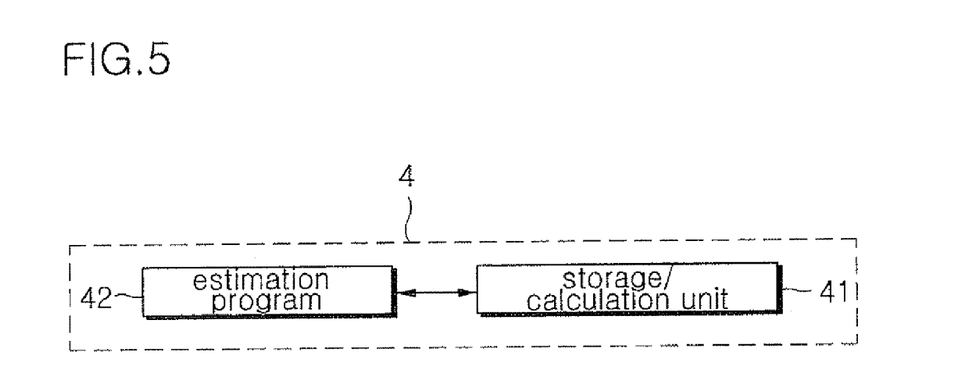
FIG. 5 is a block diagram illustrating a channel uniformity estimation unit contained in the performance inspection system for the array ultrasound transducer according to a preferred embodiment of the present invention.
Figure 6:
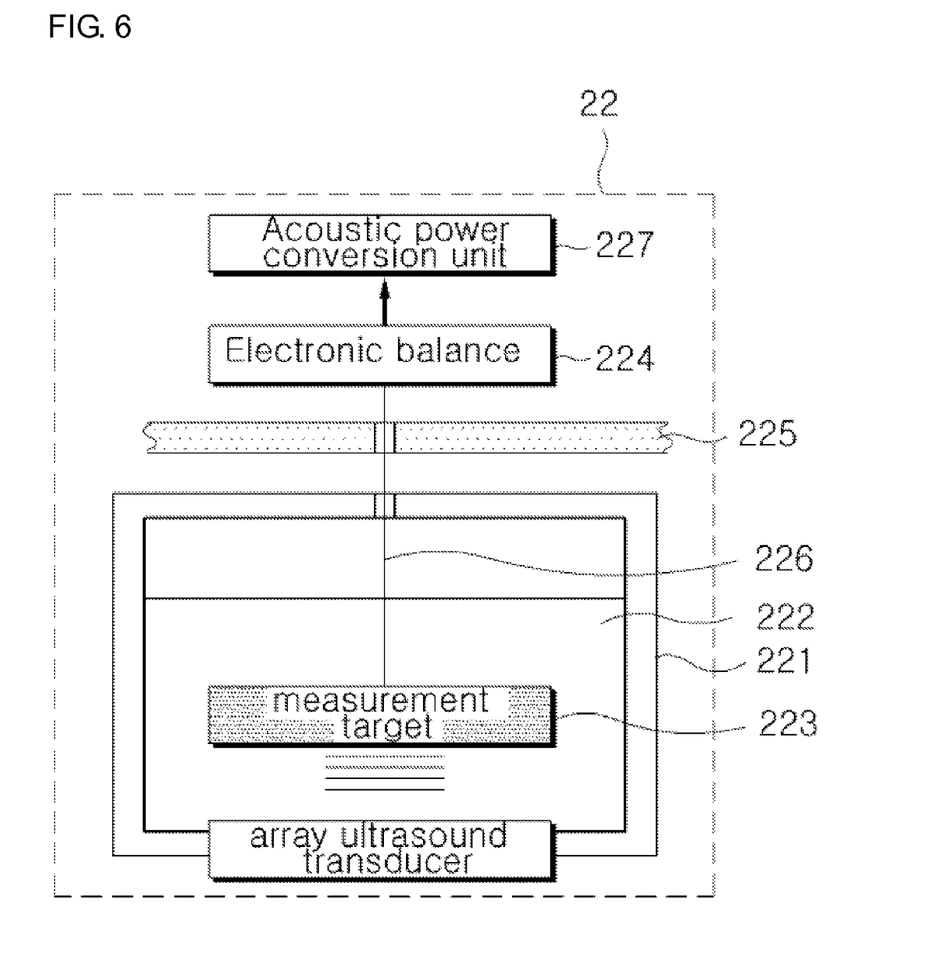
FIG. 6 is a block diagram illustrating an acoustic power measurement unit contained in the performance inspection system for the array ultrasound transducer according to a preferred embodiment of the present invention.

FIG. 1 is a block diagram illustrating a performance inspection system for an array ultrasound transducer according to a preferred embodiment of the present invention. FIG. 2 is a block diagram illustrating a driver contained in the performance inspection system of the array ultrasound transducer according to a preferred embodiment of the present invention. FIG. 3 is a block diagram illustrating an acoustic power measurement unit contained in the performance inspection system for the array ultrasound transducer according to a preferred embodiment of the present invention. FIG. 4 is a block diagram illustrating a radiation conductance conversion unit contained in the performance inspection system for the array ultrasound transducer according to a preferred embodiment of the present invention. FIG. 5 is a block diagram illustrating a channel uniformity estimation unit contained in the performance inspection system for the array ultrasound transducer according to a preferred embodiment of the present invention. FIG. 6 is a block diagram illustrating an acoustic power measurement unit contained in the performance inspection system for the array ultrasound transducer according to a preferred embodiment of the present invention.

Referring to FIG. 1, the performance inspection system for the array ultrasound transducer according to the present invention includes a driver 1, an acoustic power measurement unit 2, a radiation conductance conversion unit 3, and a channel uniformity estimation unit 4.

The driver 1 selectively applies an electric signal to all or some parts of constituent channels of the array ultrasound transducer 21.

The acoustic power measurement unit 2 measures an ultrasound acoustic power emitted from individual channels receiving the same voltage from the driver 1.

The radiation conductance conversion unit 3 measures a voltage signal applied to each channel although the driver 1 applies different voltages to the individual channels, such that it converts the measured voltage into an ultrasound acoustic power acquired when the same voltage is applied to the channels.

The channel uniformity estimation unit 4 estimates the uniformity of the acoustic power value acquired by the radiation conductance conversion unit 3 or the uniformity of acoustic power values of the individual channels measured under the same voltage.

The driver 1 is used to drive the array ultrasound transducer 21, and transmits electric signal(s) to all or some of the ultrasound transducers acting as constituent channels of the array ultrasound transducer 21. For the convenience of description and better understanding of the present invention, the above-mentioned ultrasound transducers are referred to channels, respectively.

FIG. 2 is a block diagram illustrating a driver contained in the performance inspection system of the array ultrasound transducer according to a preferred embodiment of the present invention.

Referring to FIG. 2, the driver 1 includes a power amplifier 12, a switching network 13, a voltmeter 14, a frequency counter 15, and a driver controller 16.

The power amplifier 12 amplifies the power of a signal generated from a signal generator 11. The switching network 13 selects a channel of an oscillation element of the array ultrasound transducer 21. The voltmeter 14 measures the voltage applied to the array ultrasound transducer 21. The frequency counter 15 measures a frequency. The driver controller 16 controls the signal generator, the power amplifier 12, the switching network 13, the voltmeter 14, and the frequency counter 15 according to a user request.

The signal generator 11 is equal to or similar to a signal generation unit for transmitting a signal to the ultrasound transducer (i.e., channel). The signal generated from the signal generator 11 is too weak to drive the ultrasound transducer, such that the performance inspection system for the array ultrasound transducer according to the present invention further includes the power amplifier 12 to amplify a desired signal.

The signal amplified by the power amplifier 12 includes the switching network 13 to select a desired channel from among several channels of the array ultrasound transducer 21, such that a desired signal can be transmitted over only the selected channel. The switching network 13 acting as a representative example of a relay module includes multi-channel output signals, such that input signals can be selectively transmitted to individual channels.

The voltmeter 14 acts as a unit for measuring the voltage applied to the array ultrasound transducer 21. The frequency counter 14 acts as a unit for measuring the frequency of the voltage applied to the array ultrasound transducer 21. The drive controller 16 controls operations of the above-mentioned constituent components, such that it controls the output signal of the driver according to a desired condition.

If the array ultrasound transducer 21 is driven by the driver 1, ultrasound signals occur in individual channels, and the acoustic power values of the ultrasound signals emitted from the individual channels are measured by the acoustic power measurement unit 2.

FIG. 3 is a block diagram illustrating an acoustic power measurement unit contained in the performance inspection system for the array ultrasound transducer according to a preferred embodiment of the present invention.

Referring to FIG. 3, the acoustic power measurement unit 2 includes an acoustic power measurement part 22, a support/arrangement part 23, a data collector 24, and a measurement-part controller 25.

The acoustic power measurement part 22 measures the ultrasound acoustic power emitted from the channel oscillated from the array ultrasound transducer 21.

The support/arrangement part 23 supports and arranges the array ultrasound transducer 21 and the acoustic power measurement part 22. The data collector 24 collects data measured by the acoustic power measurement part 22. The measurement-part controller 25 controls the acoustic power measurement part 22, the support/arrangement part 23, and the data collector 24.

A physical structure of the acoustic power measurement part 22 is shown in FIG. 6.

FIG. 6 is a block diagram illustrating an acoustic power measurement unit contained in the performance inspection system for the array ultrasound transducer according to a preferred embodiment of the present invention.

Referring to FIG. 6, the acoustic power measurement part 22 detects the weight of the sound-absorbing target 223 to which the radiation power is applied by the ultrasound signal emitted from the channel, and measures the acoustic power on the basis of the detected weight of the sound-absorbing target 223.

In more detail, the acoustic power measurement part 22 includes the sound-absorbing target 223, the array ultrasound transducer 21, and an electronic balance 224. The sound-absorbing target 223 is installed in a water tub 221 including the clean water 222. The array ultrasound transducer 21 is installed at a lower part of the sound-absorbing target 223, and radiates the ultrasound signal to the sound-absorbing target 223. The electronic balance 224 detects the weight of the sound-absorbing target 223 to which the radiation power is applied. The sound-absorbing target 223 is suspended at the electronic balance 224 by a connection line 226.

The electronic balance 224 is supported by the support 225 mounted to an upper part of the water tub 221. the weight of the sound-absorbing target 223 detected by the electronic balance 224 is converted into the acoustic power by the acoustic power conversion unit 227, such that the conversion result is transmitted to the data collector 24.

The acoustic power conversion unit 227 receives the weight of the sound-absorbing target 223 to which the radiation power detected by the electronic balance is applied, and converts the received weight of the sound-absorbing target 223 into the acoustic power according to a predetermined reference.

For example, the acoustic power conversion unit 227 determines a reference acoustic power on the basis of a reference weight. If a variation of the weight detected by the electronic balance 224 is set to "1", a variation of the acoustic power is also set to "1", such that the acoustic power is calculated according to the variation in weight.

The support/arrangement part 23 includes a support plate 225 for supporting the electronic balance 224, and a part for arranging different devices simultaneously while not only the array ultrasound transducer but also other devices. The above-mentioned support/arrangement part 23 is well known to those skilled in the art, so that a detailed description thereof will herein be omitted for the convenience of description.

The measurement-part controller 25 controls individual constituent elements of the acoustic power measurement unit 2, and may be integrated with the drive controller 15 contained in the driver 1, and may also include an arithmetic processing unit such as a computer.

The acoustic power measured by the acoustic power measurement unit 2 is transmitted to the radiation conductance conversion unit 3.

The radiation conductance conversion unit 3 includes a calculation program 32 (also called an operation program) and a storage/calculation unit 31 (also called a storage/operation unit).

The calculation program 32 receives the acoustic power value ($P_i$) measured for each channel by the acoustic power measurement unit 2, receives a voltage value ($V_i$) applied to the array ultrasound transducer 21, and calculates the radiation conductance ($G_i$) on the basis of the received acoustic power value (Pi) and the received voltage value ($V_i$).

The storage/calculation unit 31 acts as a microprocessor or computer capable of executing the calculation program 32.

The calculation program 32 is used to calculate the radiation conductance ($G_i$).

The radiation conductance ($G_i$) is based on the voltage value (Vi) applied to the array ultrasound transducer 21, and is calculated by the following equation:

$$G_i = \frac{P_i}{V_i^2} \qquad \text{[Equation 1]}$$

In Equation 1, $V_i$ is indicative of the voltage applied to the array ultrasound transducer 21, and $P_i$ is indicative of the acoustic power measured for each channel.

The channel uniformity estimation unit 4 includes an estimation program 42 and a storage/calculation unit 41 for driving the estimation program 42.

The estimation program 42 receives the radiation conductance value ($G_i$) for each channel with respect to the number (N) of channels calculated by the radiation conductance conversion unit 3, such that it estimates an arithmetic average value <G> of the radiation conductance value ($G_i$), a dispersion ($D_G$) of the radiation conductance, a standard deviation ($S_G$) of the radiation conductance, an arithmetic average value <P> of the acoustic power, a dispersion ($D_P$) of the radiation conductance, and a standard deviation ($S_P$) of the radiation conductance.

The dispersion ($D_P$) of the radiation conductance is calculated by the acoustic-power arithmetic average value <P> and the radiation conductance value ($P_i$) for each channel. The standard deviation ($S_P$) is calculated by the dispersion ($D_P$) of the radiation conductance.

The arithmetic average value <G> of the radiation conductance can be represented by the following equation 2:

$$<G> = \frac{1}{N} \sum_{i=1}^{N} G_i \qquad [\text{Equation 2}]$$

In Equation 2, N is indicative of the number of channels, and is a natural number.

If the radiation conductance arithmetic average value <G> and the radiation conductance value ($G_i$) for each channel are applied to the following equation 3, such that the dispersion ($D_G$) of the radiation conductance can be calculated by the following equation 3:

$$D_G = \frac{1}{(N-1)} \sum_{i=1}^{N} (<G> - G_i)^2 \qquad [\text{Equation 3}]$$

The standard deviation ($S_G$) of the radiation conductance is calculated by the dispersion ($D_G$) of the radiation conductance calculated by the above-mentioned equation, as represented by the following equation 4:

$$S_G = \sqrt{\frac{D_G}{N}} = \sqrt{\frac{\sum_{i=1}^{N}(<G>-G_i)^2}{N(N-1)}} \qquad [\text{Equation 4}]$$

The arithmetic average value <P> of the following acoustic power can be calculated by the acoustic power values ($P_i$) measured by the acoustic power measurement unit 2.

$$<P> = \frac{1}{N} \sum_{i=1}^{N} P_i \qquad [\text{Equation 5}]$$

The radiation conductance dispersion ($D_P$) can be calculated by not only radiation conductance values (Pi) for each channel but also the acoustic power arithmetic average value <P>, as represented by the following equation 6:

$$D_P = \frac{1}{(N-1)} \sum_{i=1}^{N} (<P> - P_i)^2 \qquad [\text{Equation 6}]$$

The radiation conductance standard deviation ($S_P$) can be calculated by the above-mentioned radiation conductance dispersion ($D_P$).

$$S_P = \sqrt{\frac{D_P}{N}} = \sqrt{\frac{\sum_{i=1}^{N}(<P>-P_i)^2}{N(N-1)}} \qquad [\text{Equation 7}]$$

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

As apparent from the above description, a performance, inspection system for an array ultrasound transducer according to the present invention calculates a radiation conductance on the basis of an acoustic power measured by the acoustic power measurement unit and a voltage value applied to the array ultrasound transducer, calculates a radiation-conductance arithmetic average value, a radiation conductance, a radiation-conductance dispersion, a radiation-conductance standard deviation, and an acoustic power arithmetic average value, etc., such that the array ultrasound transducer can estimate acoustic power, radiation conductance, uniformity of the acoustic power, and uniformity of sound pressure sensitivity according to a variety of uses.

In addition, since the array ultrasound transducer according to the present invention can inspect a variety of estimation items according to a variety of uses, the oscillation/reception array ultrasound transducer can separate only an oscillation performance from the oscillation/reception performances, and can estimate only the oscillation performance, such that a detailed performance estimation of the array ultrasound transducer can be implemented. And, the present invention can use a specific design capable of reducing the reception performance while increasing the oscillation performance according to a variety of uses, can use another design capable of reducing the oscillation performance while increasing the reception performance, or can also use a still another design for increasing or reducing the reception performance and the oscillation performance at the same time.

What is claimed is:

1. A performance inspection system for an array ultrasound transducer comprising:
    a driver for selectively applying an electric signal to all or some of constituent channels of the array ultrasound transducer;
    an acoustic power measurement unit for measuring an ultrasound acoustic power emitted from individual channels receiving an identical voltage from the driver;
    a radiation conductance conversion unit for measuring a voltage signal applied to the individual channels at a predefined frequency, and converting the measured voltage into an ultrasound acoustic power acquired when the identical voltage is applied to the individual channels; and
    a channel uniformity estimation unit for estimating uniformity of a channel power at the predefined frequency of the acoustic power value acquired by the radiation conductance conversion unit or uniformity of acoustic power values of the individual channels measured under the identical voltage by calculating an acoustic power arithmetic average value, a radiation conductance arithmetic average value, a radiation conductance dispersion, and a radiation conductance standard deviation.

2. The system according to claim 1, wherein the driver includes:
- a power amplifier for amplifying the power of a signal generated from a signal generator;
- a switching network for selecting a channel of an oscillation element of the array ultrasound transducer;
- a voltmeter for measuring the voltage applied to the array ultrasound transducer;
- a frequency counter for measuring a frequency of the voltage applied to the array ultrasound transducer; and
- a driver controller for controlling the signal generator, the power amplifier, the switching network, the voltmeter, and the frequency counter according to a user request.

3. The system according to claim 1, wherein the acoustic power measurement unit includes:
- an acoustic power measurement part for measuring an ultrasound acoustic power emitted from a channel oscillated from the array ultrasound transducer;
- a support part for supporting the array ultrasound transducer and the acoustic power measurement part;
- a data collector for collecting data measured by the acoustic power measurement part; and
- a measurement-part controller for controlling the acoustic power measurement part, the support part, and the data collector.

4. The system according to claim 1, wherein the radiation conductance calculation unit includes:
- a calculation program for receiving an acoustic power value ($P_i$) measured for each channel by the acoustic power measurement unit, receiving a voltage value ($V_i$) applied to the array ultrasound transducer, and calculating a radiation conductance on the basis of the received acoustic power value (Pi) and the received voltage value ($V_i$); and
- a storage/calculation unit acting as a microprocessor or computer, which is capable of executing the calculation program,
wherein the radiation conductance ($G_i$) is calculated by the following equation:

$$G_i = \frac{P_i}{V_i^2}.$$

5. The system according to claim 1, wherein the channel uniformity estimation unit includes:
- an estimation program for calculating a radiation conductance arithmetic average value <G>, a radiation conductance dispersion ($D_G$), a radiation conductance standard deviation ($S_G$), an acoustic power arithmetic average value <P>, a radiation conductance dispersion ($D_P$), and a radiation conductance standard deviation ($S_P$); and
- a storage/calculation unit for executing the estimation program,
wherein
the radiation conductance arithmetic average value <G> is calculated by the following equation A on the basis of a radiation conductance value for each channel with respect to the number (N) of channels calculated by the radiation conductance conversion unit:

$$<G> = \frac{1}{N}\sum_{i=1}^{N} G_i \qquad \text{[Equation A]}$$

the radiation conductance dispersion ($D_G$) is calculated by the following Equation B using the radiation conductance values (Gi) for each channel and the arithmetic average value <G>:

$$D_G = \frac{1}{(N-1)}\sum_{i=1}^{N}(<G> - G_i)^2 \qquad \text{[Equation B]}$$

the radiation conductance standard deviation ($S_G$) is calculated by the following equation C using the radiation conductance dispersion ($D_G$):

$$S_G = \sqrt{\frac{D_G}{N}} = \sqrt{\frac{\sum_{i=1}^{N}(<G> - G_i)^2}{N(N-1)}} \qquad \text{[Equation C]}$$

the acoustic power arithmetic average value <P> is calculated by the following equation D using the acoustic power values (Pi) measured by the acoustic power measurement unit:

$$<P> = \frac{1}{N}\sum_{i=1}^{N} P_i \qquad \text{[Equation D]}$$

the radiation conductance dispersion ($D_P$) is calculated by the following equation E using not only the radiation conductance values (Pi) for each channel but also the acoustic power arithmetic average value <P>:

$$D_P = \frac{1}{(N-1)}\sum_{i=1}^{N}(<P> - P_i)^2 \qquad \text{[Equation E]}$$

the radiation conductance standard deviation ($S_P$) is calculated by the following equation F using the radiation conductance dispersion ($D_P$):

$$S_P = \sqrt{\frac{D_P}{N}} = \sqrt{\frac{\sum_{i=1}^{N}(<P> - P_i)^2}{N(N-1)}}. \qquad \text{[Equation F]}$$

* * * * *